United States Patent
Bishop

(10) Patent No.: US 10,773,197 B1
(45) Date of Patent: Sep. 15, 2020

(54) AIR PURIFICATION SYSTEM

(71) Applicant: Joshua Bishop, Florence, AZ (US)

(72) Inventor: Joshua Bishop, Florence, AZ (US)

(*) Notice: Subject to any disclaimer, the term of this patent is extended or adjusted under 35 U.S.C. 154(b) by 0 days.

(21) Appl. No.: 16/808,521

(22) Filed: Mar. 4, 2020

Related U.S. Application Data

(63) Continuation-in-part of application No. 16/268,725, filed on Feb. 6, 2019.

(51) Int. Cl.
*B01D 46/10* (2006.01)
*B01D 46/00* (2006.01)
*F24F 13/08* (2006.01)

(52) U.S. Cl.
CPC ..... *B01D 46/0005* (2013.01); *B01D 46/0015* (2013.01); *B01D 46/10* (2013.01); *F24F 13/085* (2013.01); *B01D 2279/50* (2013.01)

(58) Field of Classification Search
CPC ............... B01D 46/10; B01D 46/0006; B01D 2279/50; F24F 13/28
USPC ...... 55/481, 357, 385.1, 496, 506, 510, 511, 55/DIG. 31
See application file for complete search history.

(56) References Cited

U.S. PATENT DOCUMENTS

| | | | |
|---|---|---|---|
| 3,793,692 A * | 2/1974 | Tate | B01D 46/10 29/896.62 |
| 4,713,099 A * | 12/1987 | Schroeder | B01D 46/10 55/385.1 |
| 5,597,392 A | 1/1997 | McCole | |
| 5,776,218 A | 7/1998 | Enns | |
| 5,944,860 A * | 8/1999 | Mack | B01D 46/0005 55/492 |
| 7,811,346 B1 * | 10/2010 | Henson | B01D 46/0005 55/385.1 |
| 8,460,419 B1 * | 6/2013 | Hobbs | B01D 46/10 55/385.2 |
| 9,132,373 B2 * | 9/2015 | Loggins | B01D 46/0005 |
| 10,434,448 B1 * | 10/2019 | Honnecke | B01D 46/0006 |

* cited by examiner

*Primary Examiner* — Minh Chau T Pham
(74) *Attorney, Agent, or Firm* — Sanchelima & Associates, P.A.; Christian Sanchelima; Jesus Sanchelima

(57) ABSTRACT

An air purification system including a vent cover assembly and an air filter assembly is disclosed. The vent cover assembly includes a vent cover with a slot that permits access to an interior of the vent cover. The vent cover is retrofitted to existing air vents to allow filtering of air in a desired room. The air filter assembly includes a filter holder having an air filter removably attached thereto. The air filter is used to remove dust and other particle from the air flowing out of the air vents. The filter holder is removably mounted within vent cover, through the slot, with the air filter attached. The air flow out from the air vents, through the air filter and out of the vent cover into the desired room. The air in particular rooms is filtered with the air filter to help improve the health of the users.

17 Claims, 6 Drawing Sheets

AIR PURIFICATION SYSTEM

OTHER RELATED APPLICATIONS

The present application is a continuation-in-part pending U.S. patent application Ser. No. 16/268,725, filed on Feb. 6, 2019, which is hereby incorporated by reference.

BACKGROUND OF THE INVENTION

1. Field of the Invention

The present invention relates to an air purification system and, more particularly, to an air purification system that can be retrofitted onto existing air vents or ducts to filter air passing through the air vent to remove dust and other particles from the passing air.

2. Description of the Related Art

Several designs for air purification systems have been designed in the past. None of them, however, include an air purification system which attaches to an existing vent or duct, there is an air filter attached to the sliding filter holder. The present invention helps to facilitate the process of filtering air in a home in an efficient manner from cooling/heating systems. Additionally, the user is able to make sure that air in a particular room is filtered before the air enters the room. This may be important as air ducts may be dirty even if a filter is attached to the air conditioning unit in a traditional manner. The user is also more likely to change the air filter as the present invention is constantly visible and easy to maintain. The present invention helps to improve the health of the user by improving the air quality that the user breathes in by removing dust and other particles from the air. Further, improved cleanliness is achieved as there is less dust and particles circulating around a home with the present invention.

Applicant believes that a related reference corresponds to U.S. Pat. No. 5,776,218 for a filter assembly that is insertable into the ducting of an air conditioning system outlet vent. Applicant believes that another related reference corresponds with U.S. Pat. No. 5,597,392 for a register filter for a force air duct outlet in heating/cooling systems. None of the references, however, teach of a simple air filtering system that can be retrofitted onto existing vents and filters air to remove dust and other particles from the air before the air enters a particular room.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an air purification system that helps to improve the health of a user.

It is another object of this invention to provide an air purification system that can be retrofitted onto existing air vents.

It is still another object of the present invention to provide an air purification system that can filter the air in a particular room.

It is also another object of the present invention to provide an air purification system that helps to improve the cleanliness in a home as less dust and other small particles are circulating in the air within the home.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
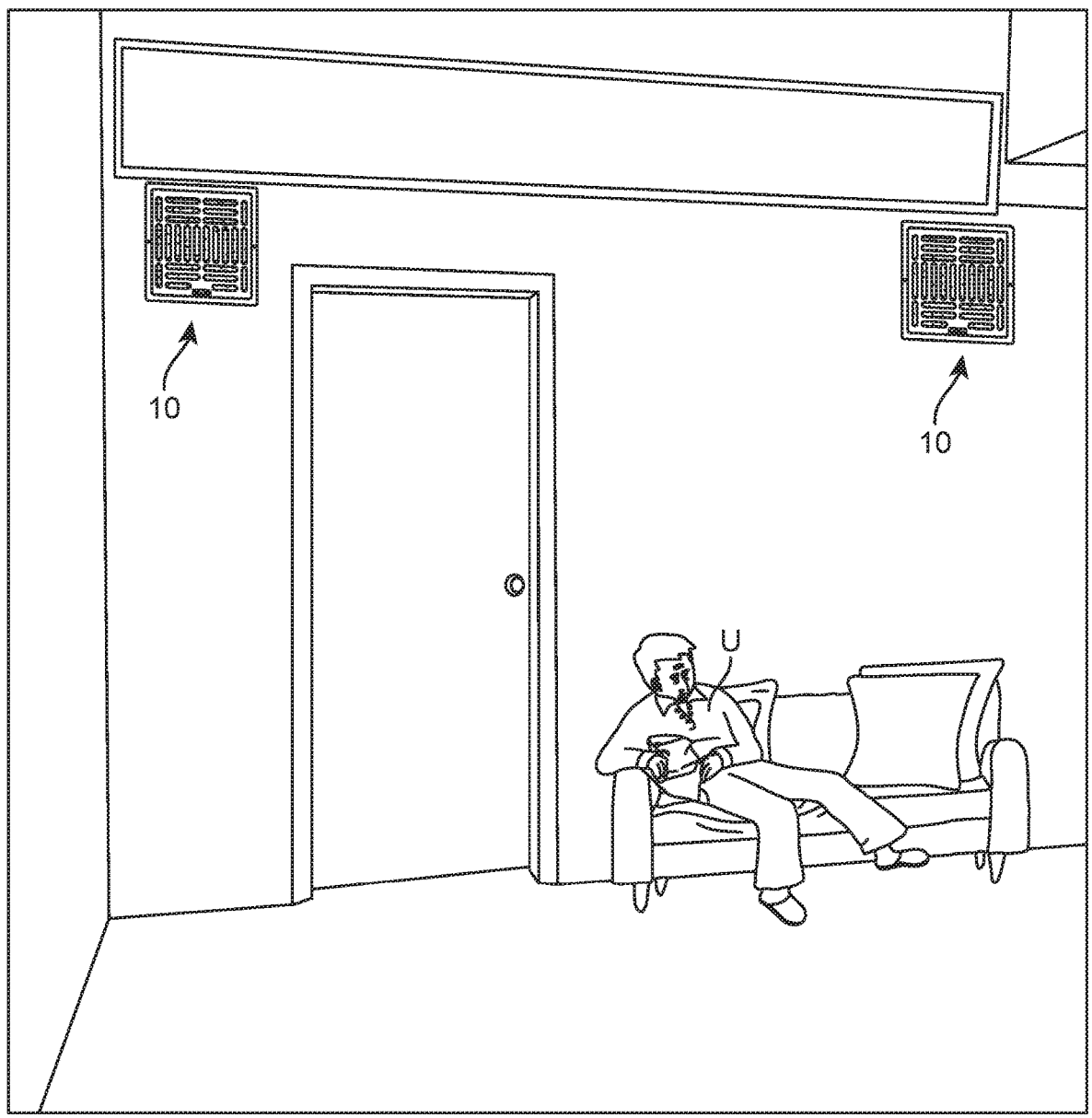
FIG. 1 represents the present invention in an operational setting mounted to a vent in a room.

Referring now to the drawings, where the present invention is generally referred to with numeral 10, it can be observed that it basically includes a vent cover assembly 20 and an air filter assembly 40.

There is often a need to purify air from an air conditioning unit as it may be desirable to inhale purified air in order to reduce health concerns. Air contains dust and other small particles that may be removed during purification. The air purification process may also help to improve the cleanliness of a house as there is less dust and small particles circulating in the air. The present invention further allows for air in particular rooms to be purified before the air flows into the rooms.

Figure 2:
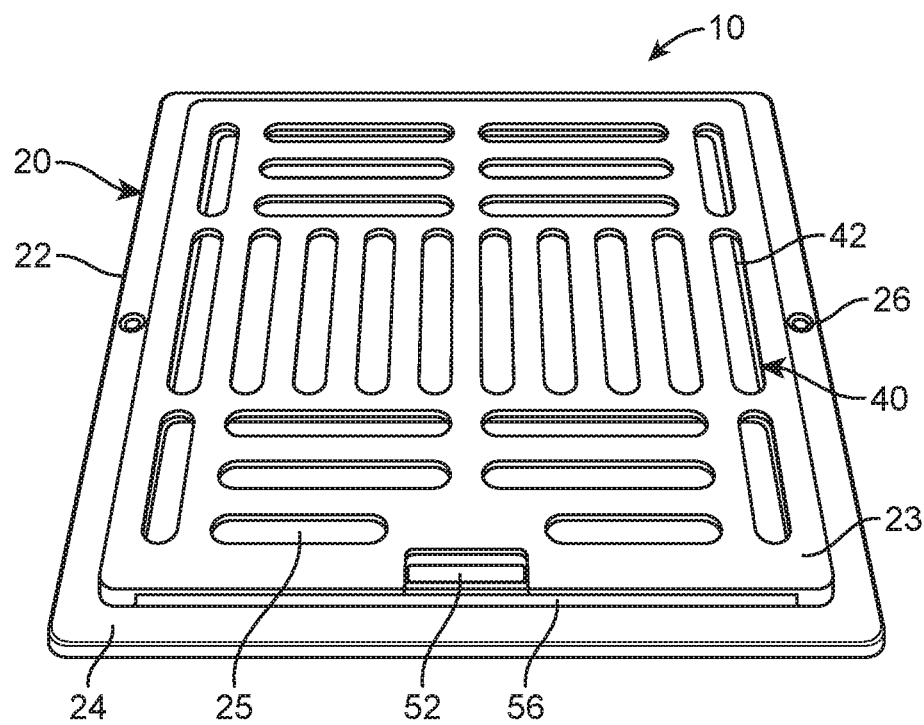
FIG. 2 shows an isometric view of the vent cover 22 with filter holder 42 retracted within.
Figure 3:
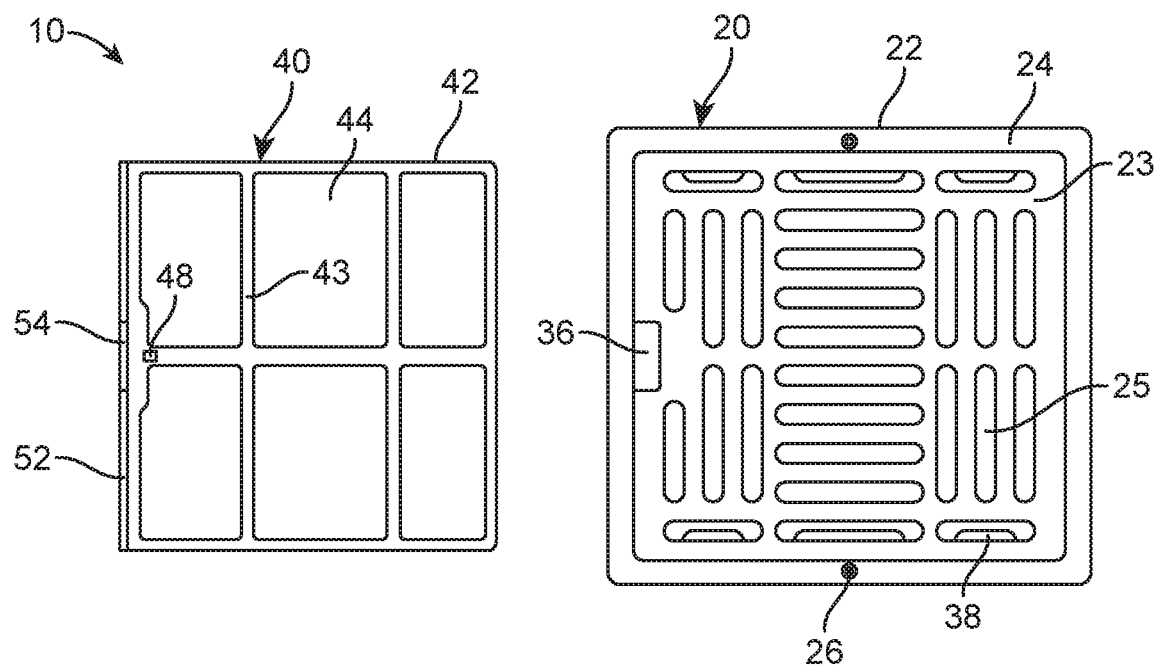
FIG. 3 illustrates a top view of vent cover 22 and filter holder 42 separated.
Figure 4:
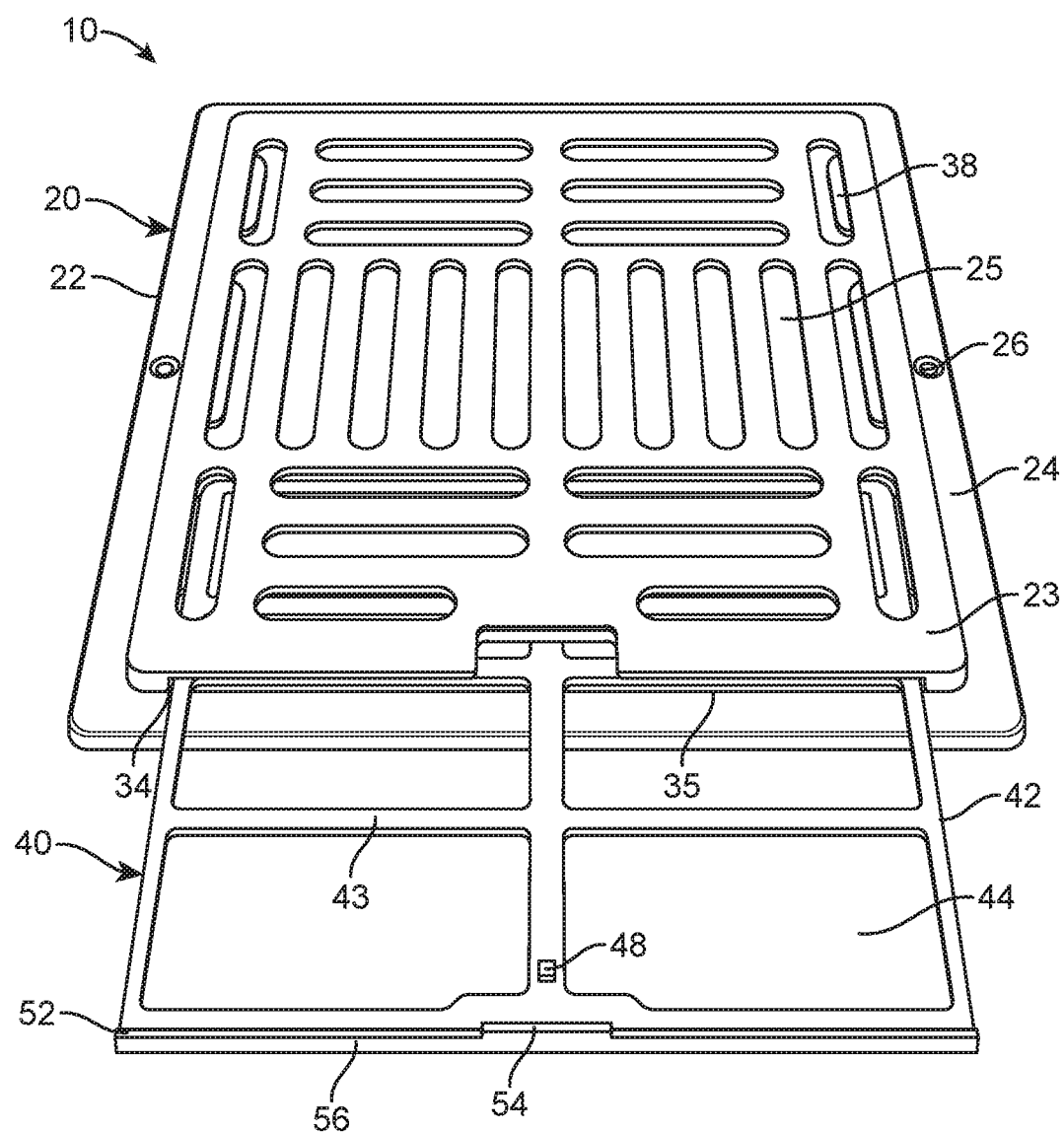
FIG. 4 is a representation of a top view of vent cover 22 with filter holder 42 partially retracted within vent cover 22.

The present invention, an air purification system 10, may be retrofitted onto existing air vents or air ducts as best seen in FIG. 1. With air purification system 10 in place, it may be possible for a user to then filter air that flows out of the air vent and through the present invention. The air purification process helps to remove dust and other particles from the air. Air purification system 10 includes vent cover assembly 20 which includes a vent cover 22. Vent cover 22 may be retrofitted to existing air vents or air ducts. Preferably, vent cover 22 may be mounted about a perimeter of existing air vents or air ducts. As such vent cover 22 may have predetermined dimensions that cooperate with existing air vents or air ducts. Vent cover 22, as best seen in FIG. 2-4, may be substantially rectangular in shape. It may also be suitable for vent cover 22 to be square. However, it is to be understood that other shapes may be suitable for vent cover 22. Preferably, vent cover 22 may be made of plastic. However, other materials such as rubber, aluminum, metal, stainless steel and the like may also be suitable for vent cover 22.

Vent cover 22 may include a raised portion 23 and an outer frame 24. Raised portion 23 may be centrally located on vent cover 22. It may be suitable for raised portion 23 to be raised a predetermined height from vent cover 22. Raised portion 23 may have a substantially rectangular or square shape. It can be seen in FIGS. 2-4 that raised portion 23 may include a plurality of air flow openings 25. Air flow openings 25 may preferably have an oblong and elongated shape. However, it is to be understood that other shapes may be suitable for air flow openings 25. Air flow openings 25 may be spaced apart on raised portion 23. It is to be understood that air flow openings 25 may each have different dimensions, in one embodiment. It can also be seen that some of air flow openings 25 may be oriented vertically while others of air flow openings 25 may be oriented horizontally on raised portion 23. As such some of air flow openings 25 may be parallel to each other and others of air flow openings 25 may be perpendicular to one another.

Extending about an entire perimeter of raised portion 23 may be outer frame 24. In one embodiment, outer frame 24 may have an equal width all around. However, in an alternate embodiment, it may be suitable for outer frame 24 to include sides which are thicker than remaining sides. Outer frame 24 may have a substantially rectangular or square shape, in one embodiment. Outer frame 24 may be of a shape that cooperates with raised portion 23. Mounted to at least one periphery side of vent cover 22 may be at least one fastener opening 26. More specifically, at least one fastener opening 26 may be mounted on at least one side of outer frame 24. At least one fastener opening 26 may be perpendicular to outer frame 24. It is to be understood that at least one fastener opening 26 may be mounted predetermined locations on outer frame 24. At least one fastener opening 26 may receive a fastener to secure vent cover 22 to a surface, such as a wall, about an existing air vent or air duct. In one embodiment, the fastener may be a screw or nail. It may be suitable for at least one fastener opening 26 to be threaded, in one embodiment. More of at least one fastener opening 26 may be suitable to better secure vent cover 22 to the needed surface.

Figure 5:
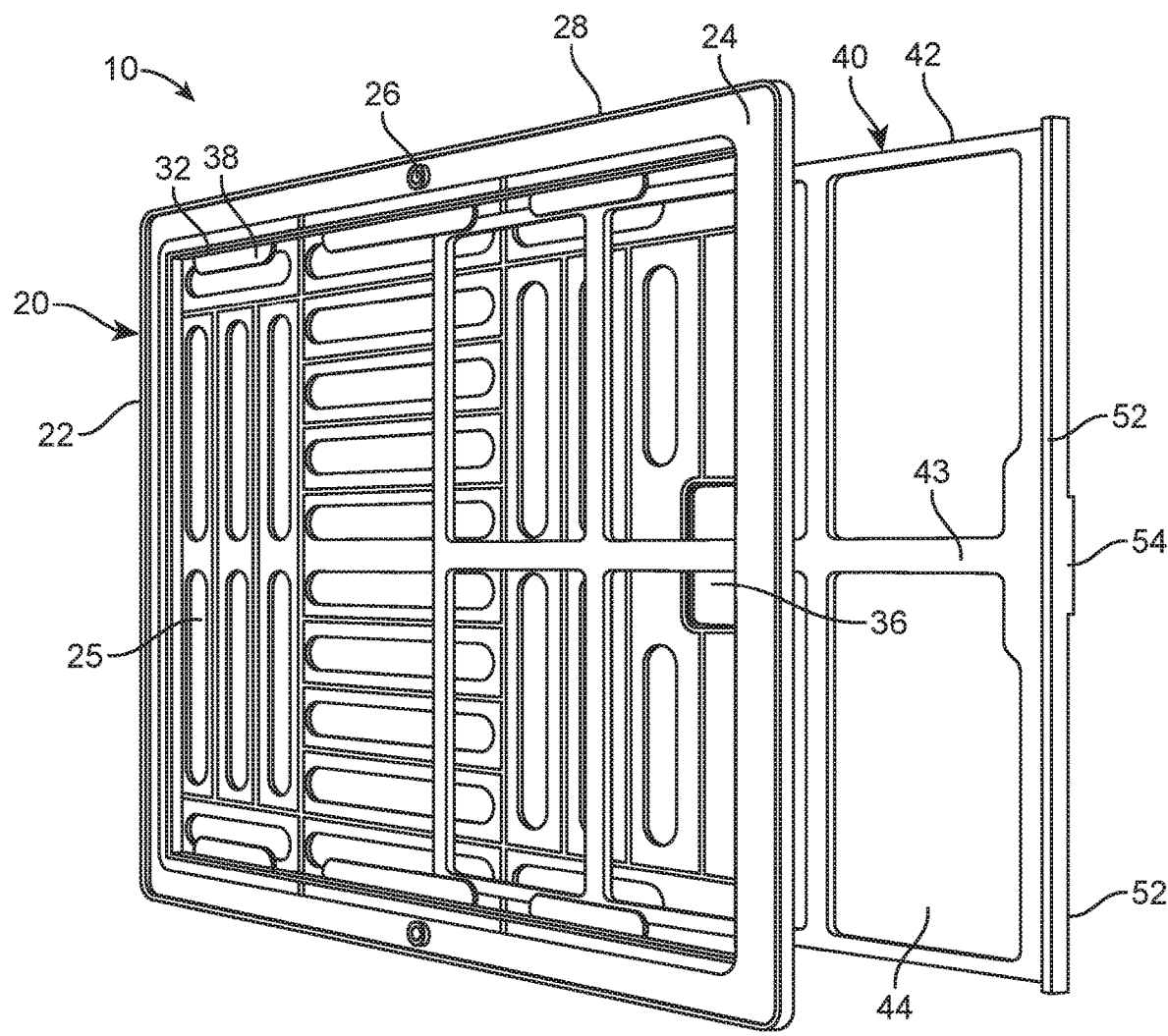
FIG. 5 is a represents of a bottom view of vent cover 22 with filter holder 42 partially retracted within vent cover 22.
Figure 6:
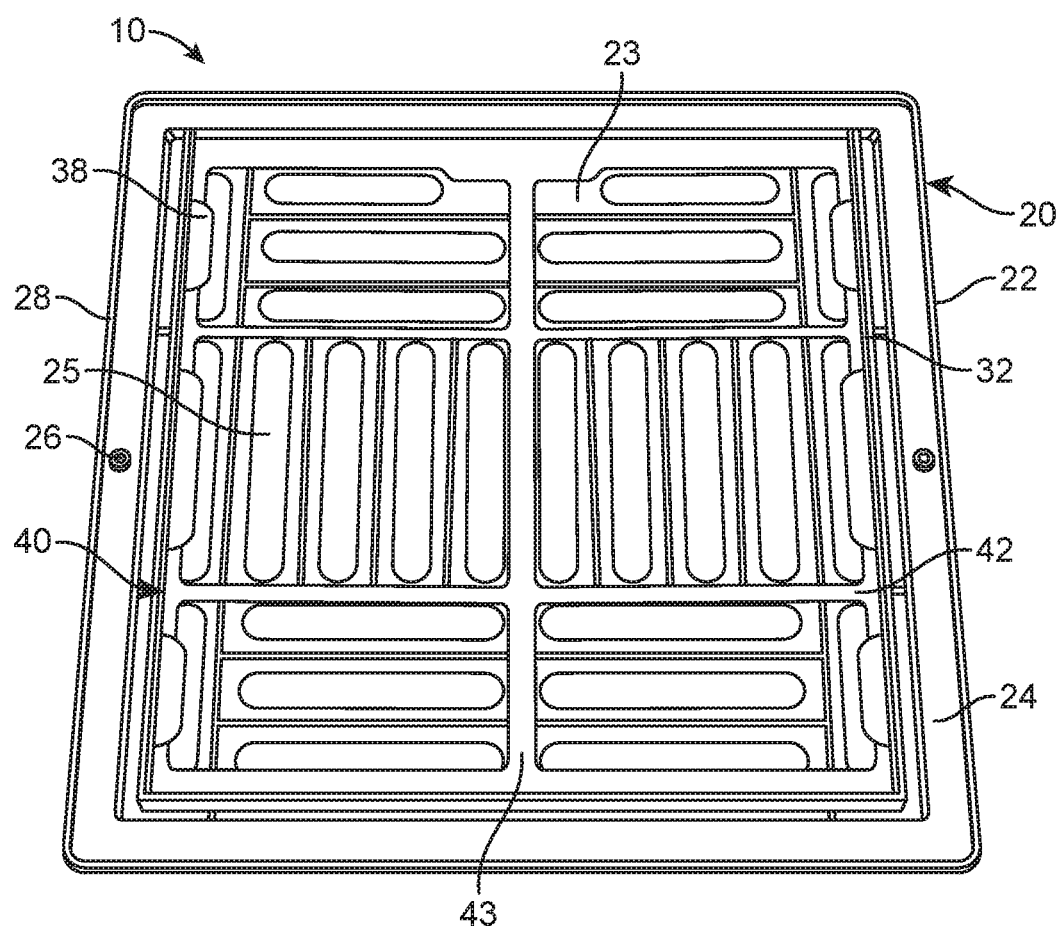
FIG. 6 shows a bottom view of vent cover 22 with filter holder 42 entirely retracted therein.

As best seen in FIGS. 5 and 6, it can be seen that vent cover assembly 20 further includes frame sidewalls 28 and raised portion sidewalls 32. More specifically, frame sidewalls 28 and raised portion sidewalls 32 may be seen underneath of vent cover 22. It can be seen that frame sidewalls 28 extend downwardly about an entire perimeter of outer frame 24. In one embodiment, there may be four of frame sidewalls 28. However, it is to be understood that the number of frame sidewalls 28 may correspond with the shape and number of sides of outer frame 24. Frame sidewalls 28 may provide support and stability to vent cover 22 when mounted to the desired surface. Raised portion sidewalls 32 may extend downwardly and about a partial perimeter of raised portion 23. Raised portion sidewalls 32 elevate and support raised portion 23 above of outer frame 24. It can be seen that there are three of raised portion sidewalls 32, to leave an open side underneath of raised portion 23. However, it is to be understood that the number of raised portion sidewalls 32 corresponds with the shape of raised portion 23. It is to be understood that, preferably, there is to be one more of frame sidewalls 28 than of raised portion sidewalls 32. Raised portion sidewalls 32 may be received within the air vent or air duct that is to be covered by the present invention. Raised portion sidewalls 32 may extend within a perimeter of the air vent or air duct mounted thereto. Raised portion sidewalls 32 guide and direct airflow towards raised portion 23 and air flow openings 25. Additionally, raised portion sidewalls 32 help to provide support and stability for the present invention when mounted to the desire air vent or air duct.

As best seen in FIG. 5, it can be seen that vent cover assembly 20 further includes a slot 34 and a slot edge 35. More specifically, slot 34 can be on a peripheral side of raised portion 23 similar to raised portion sidewalls 32. Slot 34 may be beneath of raised portion 23. Slot 34 may be an opening. Slot 34 may be on the side of raised portion 23 where one of raised portion sidewalls 32 is absent. Slot 34 may extend between two of raised portion sidewalls 32. Slot 34 may be adjacent to raised portion sidewalls 32. Slot 34 may extend a partial width of raised portion 23. Slot 34 may have a substantially rectangular shape, but other shapes may be suitable for slot 34. Slot edge 35 may be a top edge of outer frame 24 that is directly beneath of raised portion 23. Slot 34 may be defined as the spacing between the top edge of outer frame and the bottom edge of raised portion 23. Slot 34 may lead to an interior of raised portion 23. It is to be understood that slot 34 may receive air filter assembly 40 therein as depicted in FIGS. 2 and 4.

Referring to FIG. 3, it can be seen that vent cover 22 includes a grip slot 36. Preferably, grip slot 36 may be above of slot 34. Grip slot 36 may extend partially across the width of raised portion 23. Grip slot 36 may be centrally located on a peripheral side of raised portion 23. Grip slot 36 may extend away from slot 34. It is to be understood that grip slot 36 may preferably be on a same plane as air flow openings 25. Grip slot 36 may be of a rectangular shape, in one embodiment. However, other shapes may be suitable for grip slot 36. Slot 34 may preferably be wider than grip slot 36. It may be suitable for slot 34 and grip slot 36 to be perpendicular to each other. Grip slot 36 may be open on a peripheral side thereof. Grip slot 36 may receive select components of air filter assembly 40.

There may be additional components of vent cover assembly 20 which may be best seen in FIG. 3. Vent cover assembly 20 may further include support members 38. Support members 38 may be mounted perpendicularly to raised portion sidewalls 32. More specifically, support members 38 may be mounted on raised portion sidewalls 32 which are opposite to one another. Support members 38 may extend outwardly and away from raised portion sidewalls 32. It can be seen that support members 38 may be evenly spaced apart on raised portion sidewalls 32 to which support members 38 are mounted thereto. It can also be seen that support members 38 may be parallel to each other. Preferably, support members 38 may have an oblong and elongated shape. However, it is to be understood that other shapes may be suitable for support members 38. In a preferred embodiment, it may be suitable for support members 38 to be of different dimensions. In an alternate embodiment, support members 38 may be of same dimensions. Support members 38 may provide support for air filter assembly 40 once inserted into slot 34.

Air filter assembly 40 may preferably be inserted through slot 34 and partially received within raised portion 23. Air filter assembly 40 may include a filter holder 42. Filter holder 42 may be slidably inserted into slot 32. Filter holder 42 may be removable from vent cover 22. Filter holder 42 may be supported and held in place by support members 38 when filter holder 42 is inserted into raised portion 23 through slot 34. Filter holder 42 may be mounted atop of and secured by support member 38. Filter holder 42 may have a rectangular shape that cooperates with raised portion 23. Filter holder 42 may include holder dividers 43 which extend partially across a width and length of filter holder 42.

Holder dividers extend vertically and horizontally across filter holder 42. Holder dividers 43 may intersect to create holder openings 44. Holder openings 44 may be within the perimeter of holder dividers 43. Holder openings 44 may be adjacent and parallel to each other. In one embodiment, holder openings 44 may be of a same dimension. However, in the preferred embodiment, as seen in FIG. 3, holder openings 44 may be of different sizes and dimensions. Holder openings 44 allow for air to flow from the air vents and through holder openings 44.

Figure 7:
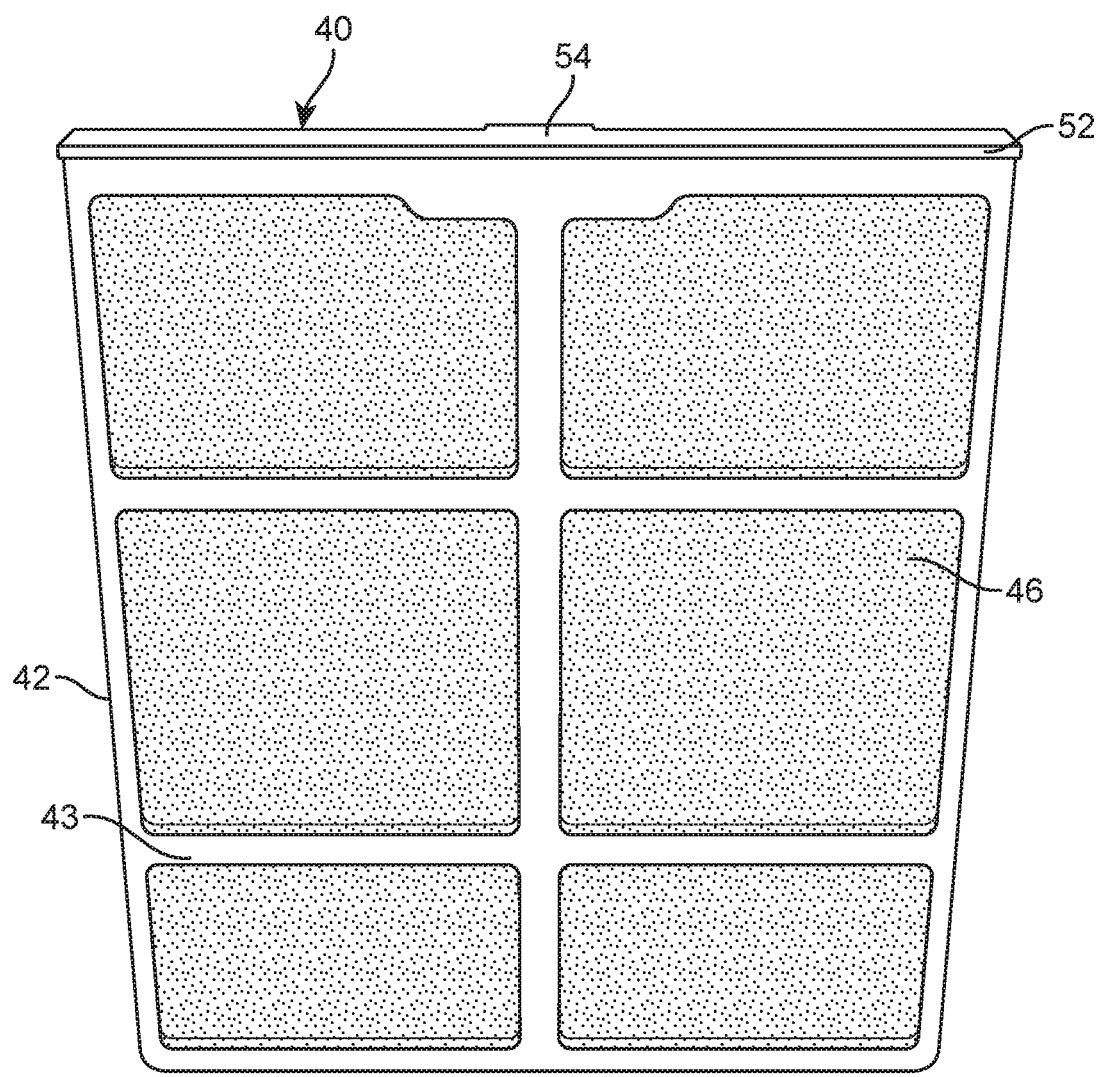
FIG. 7 illustrates a bottom view of filter holder 42 with an air filter 46 secured thereto.

Importantly, mounted to filter holder 42 may be an air filter 46, as best seen in FIG. 7. Air filter 46 may be mounted to a top side of filter holder 42. Air filter 46 may have a shape and dimensions that cooperate with filter holder 42. Air filter 46 may entirely cover holder openings 44. It may be preferable for air filter 46 to be made of polyester. However, it may be suitable for air filter 46 to be made of other materials as well. Air filter 46 may help to remove dust and other particle from air that is flowing out of the air vents and through air filter 46. This allows for better air quality to flow into rooms in which the present invention is mounted within. Air filter 46 filters the air before it reaches users to help improve the health of the users. Air filter 46 may be secured to filter holder 42 with a securing member 48. Securing member 48 may be best seen in FIGS. 3 and 4. Securing member 48 may be mounted onto the top side of one of holder dividers 43. Securing member 48 may extend outwardly and away from holder dividers 43. Securing member 48 may simply latch onto air filter 46 to maintain air filter 46 attached to filter holder 42. It is to be understood that air filter 46 may preferably be replaceable. After prolonged usage, it may be necessary to replace air filter 46 in order to maintain air filter 46 working optimally. Dust and other particles become entrapped within air filter 46 during usage, requiring replacement of air filter 46 after a predetermined length of time. The dust and other particles caught in air filter 46 prevent proper filtering and flowing of air from air vents into rooms, hence the need for replacements. In an alternate embodiment, air filter 46 may be washable and reusable.

Mounted to filter holder 42 may be a grip support 52, a grip portion 54 and a lip 56. Grip support 52 may be mounted to onto the top side of filter holder 42. More specifically, grip support 52 may be mounted onto a front edge of filter holder 42. Preferably, grip support 52 may extend about the length of filter holder 42. Grip support 52 may be rectangular, in one embodiment. Grip support 52 may extend outwardly and away from filter holder 52. Centrally mounted onto grip support 52 may be a grip portion 54. Grip portion 54 may extend outwardly and away from grip support 52. In one embodiment, grip portion 54 may preferably be rectangular. However, it is to be understood that other shapes may be suitable for grip portion 54. Grip slot 36 and grip portion 54 may be of a shape and dimensions that cooperate with one another. The width of grip slot 36 may be slightly greater than the width of grip portion 54. The length of grip slot 36 may be substantially greater than the length of grip portion 54. Grip slot 36 may receive grip portion 54 therein. Grip portion 54 may facilitate sliding filter holder 42 in and out of slot 34. Grip portion 54 may provide the users with a portion that can be grasped for ease of sliding filter holder 42 in and out of slot 34. The users may push and pull filter holder 42 in and out, respectively, of slot 34 with grip portion 54. An excess portion may be behind the grip portion 54, which may help to provide a stable structure to filter holder 42. Lip 56 may be mounted to a front edge of filter holder 42. Lip 56 may extend outwardly and away from filter holder 42. Lip 56 may be perpendicular to grip portion 54. Lip 56 may extend the width of filter holder 42. When filter holder 42 is inserted into slot 34 entirely, lip 56 may engage slot edge 35 to keep and secure filter holder 42 within raised portion 23. Lip 56 may be released from slot edge 35 to allow for filter holder 42 to slid freely in and out of raised portion 23 and slot 34. Preferably, lip 56 may be behind or beneath of slot edge 35.

The present invention can be retrofitted onto existing air vents and air ducts to filter dust and other particles from air that is to enter a particular room. Vent cover 22 may be mounted to the air vents. Inside of vent cover 22 may be filter holder 42 which has air filter 46 attached thereto. Air flowing out of the air vents may flow through air filter 46 to be purified. Once the air is purified, the air may continue to flow through vent cover 22 and out towards the desired room. This helps to provide cleaner air which may help to improve the health of a user U.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An air purification system, comprising:
   a) a vent cover assembly including a vent cover, said vent cover including air flow openings, said vent cover including a raised portion, said raised portion including raised portion sidewalls, said sidewalls being entirely solid, said raised portion including a grip slot on a top surface thereof, said grip slot recessed within said raised portion; and
   b) an air filter assembly including a filter holder, a securing member mounted onto said filter holder, said filter holder having an air filter mounted thereto, said securing member engaging and securing said air filter to said filter holder, said filter holder inserted and secured within said vent cover, said vent cover mounted to a surface adapted to cover an air vent, air flowing through said air filter, said air filter adapted to remove dust and small particles from said air before said air flows out through said air flow openings to a user, said filter holder removed from said vent cover through said grip slot.

2. The system of claim 1, wherein said vent cover includes an outer frame, said outer frame extending about a perimeter of said raised portion, said raised portion extending outwardly and away from said outer frame.

3. The system of claim 1, wherein said outer frame includes at least fastener opening, said at least one fastener opening being perpendicular to said raised portion sidewalls, said at least one fastener opening adapted to receive a fastener to secure said vent cover to said surface.

4. The system of claim 1, said raised portion sidewalls extend along a partial perimeter of said raised portion, said raised portion sidewalls leaving an open side.

5. The system of claim 2, wherein said outer frame includes frame sidewalls underneath of said outer frame, said outer frame extending about the entire perimeter of said outer frame, said frame sidewalls extending outwardly and away from said outer frame, said frame sidewalls providing support for said vent cover when said vent cover is secured to said surface.

6. The system of claim 4, wherein said open side is further defined as a slot, said slot extending partially across a width of said raised portion, said slot extending from a top of said outer frame and a bottom of said raised portion, said top of said outer frame defined as a slot edge, said filter holder inserted through said slot for securing said filter holder within said raised portion.

7. The system of claim 6, wherein said grip slot being on lateral edge of said raised portion above of said slot, said grip slot extending partially across the width of said raised portion, said grip slot being perpendicular to said slot, said grip slot extending away from said slot, said grip slot being shorter than said slot, said grip slot having a side opening.

8. The system of claim 1, wherein said vent cover assembly includes support members, said support members being perpendicularly mounted to said raised portion sidewalls, said support members extending outwardly and away from said raised portion sidewalls, said support members being on at least two opposite of said raised portion sidewalls, said support members being evenly spaced apart and being parallel to each other, said filter holder supported by said support members when said filter holder is inserted into said raised portion.

9. The system of claim 1, wherein said air filter assembly further includes holder dividers on said filter holder, said holder dividers extend partially across a width and length of said filter holder, said holder dividers extend vertically and horizontally across said filter holder.

10. The system of claim 9, wherein said holder dividers intersect to create holder openings, said holder openings being within a perimeter of holder dividers, said holder openings being entirely covered by said air filter.

11. The system of claim 10, wherein said holder openings are substantially rectangular.

12. The system of claim 7, wherein said air filter assembly further includes a grip support, said grip support extending across a width of said filter holder on a side of said filter holder, said grip support extending outwardly and away from said filter holder, said grip support being beneath of said grip slot when said filter holder is entirely received within said raised portion.

13. The system of claim 12, wherein said air filter assembly includes an grip portion, said grip portion being centrally mounted on said grip support, said grip portion extending outwardly and away from said grip support, said grip portion being entirely received within said grip slot, said grip slot including a spacing even when said grip portion is received therein.

14. The system of claim 12, wherein said air filter assembly includes a lip, said lip being of the same width as said grip support, said lip being perpendicular to said grip support, said lip extending outwardly and away from said grip support, said lip secured behind said slot edge when said filter holder is received within said vent cover.

15. The system of claim 1, wherein some of said air flow openings are perpendicular to one another and others of said air flow openings are parallel to each other.

16. The system of claim 1, wherein said air flow openings are of different dimensions.

17. The system of claim 1, wherein said air filter is removable and replaceable.

* * * * *